G. STONE.
APPARATUS FOR DRYING FIBROUS MATERIALS, &c.
APPLICATION FILED APR. 17, 1913.

1,086,567.

Patented Feb. 10, 1914.

2 SHEETS—SHEET 1.

Witnesses:
F. R. Roulstone
P. W. Pezzetti

Inventor:
George Stone
by Wright Brown Quimby May
Atty's

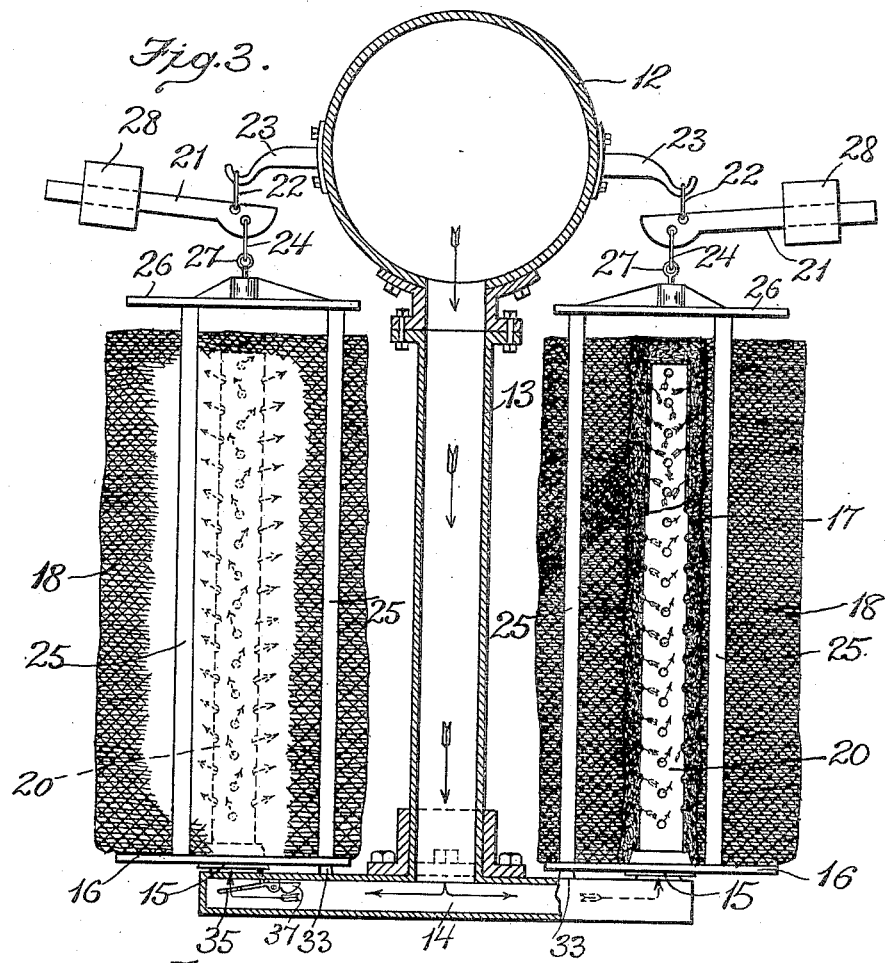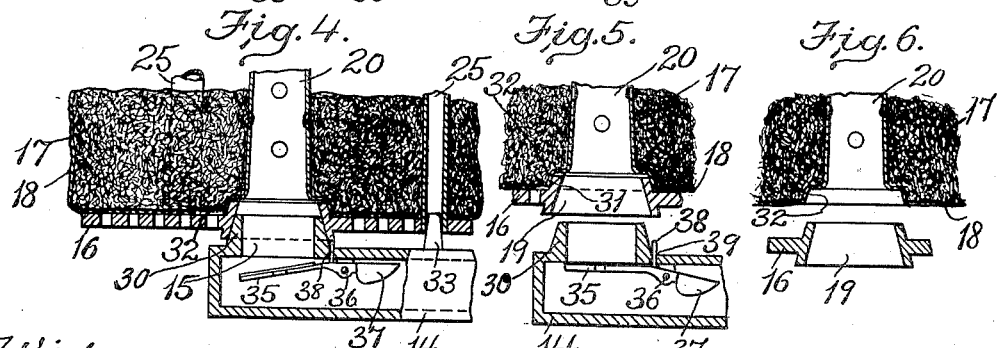

UNITED STATES PATENT OFFICE.

GEORGE STONE, OF NORTH ANDOVER, MASSACHUSETTS, ASSIGNOR TO M. T. STEVENS & SONS COMPANY, OF NORTH ANDOVER, MASSACHUSETTS, A CORPORATION OF MASSACHUSETTS.

APPARATUS FOR DRYING FIBROUS MATERIALS, &c.

1,086,567.     Specification of Letters Patent.     Patented Feb. 10, 1914.

Application filed April 17, 1913. Serial No. 761,732.

*To all whom it may concern:*

Be it known that I, GEORGE STONE, a citizen of the United States, and a resident of North Andover, in the county of Essex and State of Massachusetts, have invented certain new and useful Improvements in Apparatus for Drying Fibrous Materials, &c., of which the following is a specification.

This invention relates to an apparatus for drying fibrous materials such as wool, and is particularly intended for drying raw wool sufficiently to prepare it for subsequent operations.

The invention has for its object to provide a drying apparatus adapted to treat the material to be dried in the form of masses or packages, and to force air into said packages until the weight of the material is sufficiently reduced by evaporation, whereupon the package is automatically raised and the drying operation is automatically stopped.

The invention consists in the improvements which I will now proceed to describe and claim.

Figure 1:
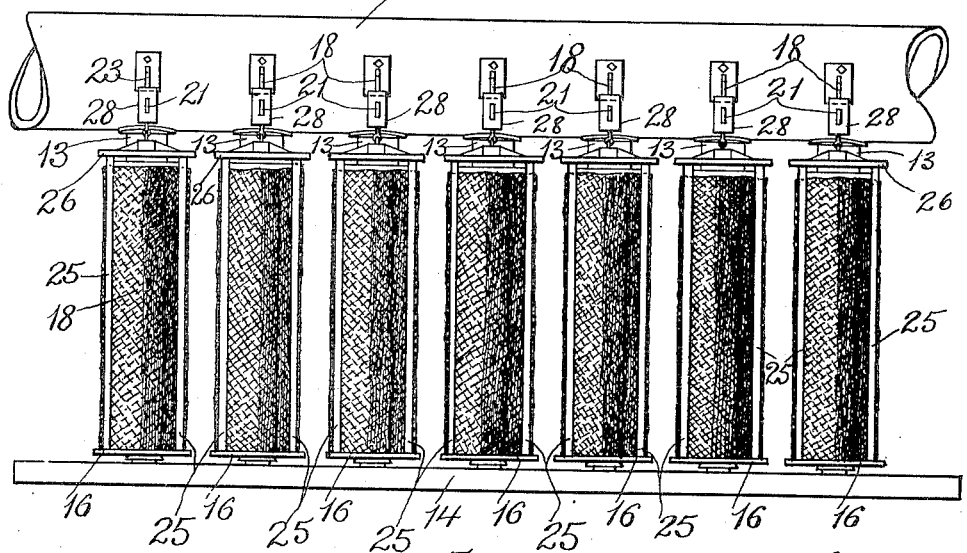
Figure 2:
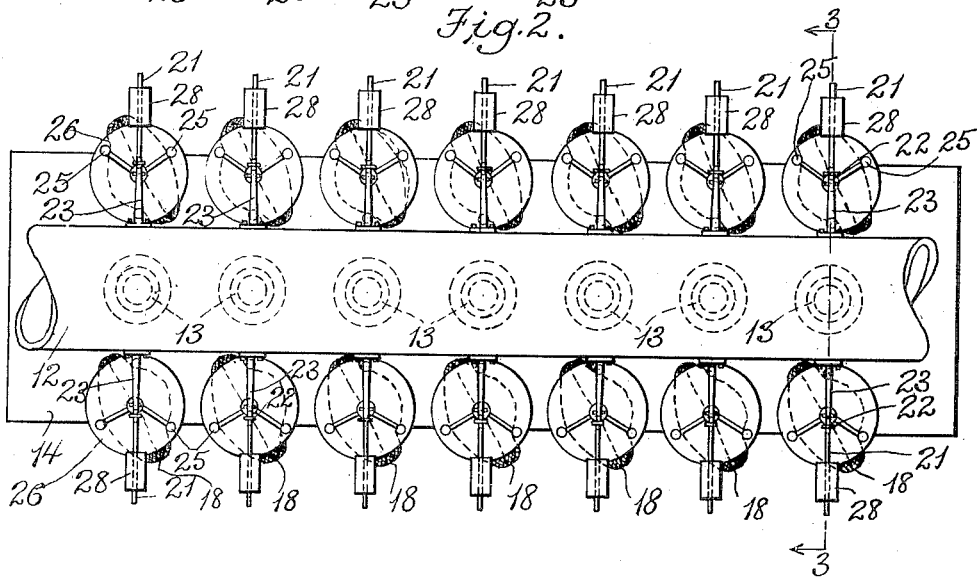

Of the accompanying drawings—Figure 1 represents a side elevation of a drying apparatus embodying my invention. Fig. 2 represents a top plan view of the same. Fig. 3 represents a section on line 3—3 of Fig. 2. Fig. 4 represents an enlargement of a portion of Fig. 3. Fig. 5 represents a view similar to Fig. 4 showing the support for the material separated from the outlet of the air conduit. Fig. 6 represents a sectional view showing the air distributing nozzle and the package of material in which it is contained raised from the support.

The same reference characters indicate the same parts in all the figures.

In the drawings:—12 represents a main air conduit which is preferably horizontal and receives air under pressure from a suitable source of supply, not shown. Said conduit is provided with a series of downwardly extending branches 13, each terminating at its lower end in lateral parts or extensions 14. Each part 14 therefore constitutes a portion of an air conduit through which air is adapted to be forced for drying purposes, said conduit being provided with an outlet 15 adapted to direct a current of air upwardly. The conduit constitutes a means for applying an evaporating agent to the support hereinafter referred to and its load.

16 represents a movable support for the material 17 to be dried, said material, in the case of raw wool, being disposed in the form of a package inclosed by a bag or other retaining means 18. The support 16 is preferably a flat plate forming the seat for the lower end of the package, and is provided with a central opening 19 adapted to coincide with the outlet 15. When said outlet and opening coincide, air from the conduit is adapted to pass from the support and into the material 17 thereon. The air is preferably distributed by a distributing nozzle 20 which is detachably engaged with the support 16 and constitutes a continuation of the opening 19, said nozzle being provided with numerous perforations and being adapted to extend through the greater portion of the length of the package. In practice the nozzle 20 is placed in the bag 18 while the latter is being charged, the material 17 being packed around the nozzle, so that when the bag is filled the entire package, including the nozzle, may be placed upon the support 16.

Means are provided whereby the support 16 may be normally held yieldingly above the outlet 15, as shown by Fig. 5, the opening 19 in the support being thus separated from the air outlet 15, said means being of such nature that when a package of undried material 17 is deposited on the support, the weight of the package will depress the support and cause its opening to coincide with the air outlet 15, as shown by Fig. 4.

The preferred means for yieldingly holding the support in a raised position are as follows:— 21 represents a lever fulcrumed on a link 22 depending from a hooked arm 23 attached to the main conduit 12. The shorter arm of said lever is connected by a link 24 with a frame attached to the support 16, said frame comprising vertical rods 25 attached to the marginal portions of the support 16, and a head 26 attached to the upper ends of said rods and having an eye 27 adapted to engage the link 24. The longer arm of the lever 21 is provided with a weight 28 which is preferably adjustable on said arm.

It will now be seen that when there is no load on the support 16, said support is held yieldingly in a raised position by the means described, and that when a package of undried material 17 is placed on the support, the weight of the package depresses the support and connects the opening 19 with the air outlet 15. The material 17 is now dried by air forced into it, until its weight is so reduced by evaporation that the weighted arm of the lever 21 is able to raise the support and its load, thus disconnecting the opening 19 from the air outlet 15, as shown by Fig. 5, and suspending the drying operation, the changed position of the support and the package indicating to the attendant that the proper time for the removal of the package has arrived.

The adjustable weight 28 enables the lifting force of the lever to be adjusted so that in case it is not desired to completely evaporate the moisture from the material, the support may be automatically raised before the material is completely dried.

To insure the formation of a practically air tight separable joint between the air outlet 15 and the support 16, I provide the air outlet with a joint member or nipple 30 adapted to accurately fit a complemental joint member formed by the interior of the opening 19 in the support 16. The support 16 and the air distributing nozzle 20 are preferably provided, for the same purpose, with complemental joint members, one of which is an upwardly projecting annular seat 31 on the support 16, and the other a downwardly projecting annular flange 32 on the base of the nozzle 20. To prevent loose movement of the support 16 about the outlet 15, I provide the conduit portion 14 with a stud 33, adapted to enter an orifice formed by one of the tubular rods 25, as shown by Fig. 4.

A complete apparatus embodying my invention will include a plurality of supports 16, conduit portions 14, and devices for yieldingly holding said supports in a raised position.

I do not limit myself to the two armed lever as the yielding means for holding or sustaining the material support in a raised position, it being obvious that any other sustaining means adapted to yield to a given weight on the support, and to act to overcome a decreased weight, may be substituted for the means here shown.

It is further obvious that the construction of the support for the material and the means for connecting it with the sustaining means may be variously modified without departing from the spirit of the invention.

The yieldingly sustained material support may be used with other suitable means for drying the supported material. I prefer to provide automatic means for closing the air outlet 15 when the support 16 is raised, and for opening said outlet when the support is lowered. To this end I provide a valve 35 which is pivoted at 36 within the conduit 14, said valve having a weight 37 adapted to normally close the valve as shown by Fig. 5, the valve being delicately poised so that the air pressure in the conduit is nearly sufficient to hold the valve closed. 38 represents a loose pin which is movable in an orifice 39 in the top of the conduit 14 and rests on the valve 35. When the support is depressed, it strikes the pin 38 and opens the valve 35. When the support is raised as described after a decrease in the weight of its load, the valve automatically closes, thus preventing further escape of air through the outlet 15, and at the same time raises the pin 38. The lever 21, its adjustable weight 28, and the support or platform 16, constitute what may be called a "weighmaster's scale" which may be used to ascertain the exact weight of the load, the scale weight 28 being first adjusted until it balances the support and load, and holds the same slightly raised, and then moved inwardly toward the fulcrum until the support and load overbalance the scale weight, the extent of inward movement of the scale weight determining the amount of moisture which must be evaporated before the scale weight can again lift the material.

I do not limit myself to the employment of a bag for confining the material to be dried, as any other receptacle may be employed for this purpose, or the material may be held in suitable form by a wrapping cord, or by a perforated sheet metal or wire fabric case. It is obvious that materials other than wool may be treated by the described apparatus.

What I claim and desire to secure by Letters Patent is:—

1. A drying apparatus comprising a vertically movable support for material to be dried, means for applying an evaporating agent to said support and its load, and yielding support-sustaining means adapted to yield under the weight of a load of undried material on the support, and thereby connect the support with said applying means, and to raise the support and load and disconnect the same from the applying means when the weight of the load is reduced by evaporation.

2. A drying apparatus comprising an air conduit having an outlet, a movable support for material to be dried, and yielding means for normally holding said support in a raised position above said outlet, the support being movable toward the outlet by the weight of undried material, and automatically raised when the weight of the material is reduced by evaporation.

3. A drying apparatus comprising an air conduit having an outlet, a movable support for material to be dried, and a lever fulcrumed above the support and having a shorter arm connected with the support, and a weighted longer arm adapted to normally hold the support in a raised position, the support being movable toward the outlet by the weight of undried material, and the weighted arm being adapted to raise the support and its load when the latter is lightened by evaporation.

4. A drying apparatus comprising an air conduit having an outlet, a movable material-support having an opening adapted to coincide with the outlet, and means for normally holding said support yieldingly in a raised position above the outlet, the support being movable toward the outlet by the weight of undried material thereon.

5. A drying apparatus comprising an air conduit having an outlet, a movable material-support having an opening adapted to coincide with the outlet, and means for normally holding said support yieldingly in a raised position above the outlet, the support being movable toward the outlet by the weight of undried material thereon and provided with an upwardly projecting air-distributing nozzle.

6. A drying apparatus comprising an air conduit having an outlet, a movable material-support having an opening adapted to coincide with the outlet, and means for normally holding said support yieldingly in a raised position above the outlet, the support being movable toward the outlet by the weight of undried material thereon, and provided with an upwardly projecting air-distributing nozzle which is detachably connected with the support and separable therefrom with the dried material.

7. A drying apparatus comprising an air conduit having an air outlet, a movable material-support having an opening adapted to coincide with said outlet, the said outlet and support being provided with complemental members adapted to form a separable joint permitting the separation of the support from the outlet, an air distributing nozzle adapted to be inclosed in a package of material to be dried, said nozzle and support being also provided with complemental members adapted to form a separable joint permitting the application and removal of the nozzle to and from the support, with the package, and means for normally holding the support yieldingly in a raised position separated from said outlet.

8. A drying apparatus comprising an air conduit having an upwardly projecting nipple forming an air outlet, a movable material-support having an opening adapted to separably engage said nipple, the wall of said opening being extended to form an upwardly projecting seat, an air-distributing nozzle having a base flange adapted to separably engage said seat, the said nozzle being adapted to be inclosed in a package of material to be dried, and applicable to and removable from the said seat with said package, and means for normally holding the support yieldingly in a raised position separated from said nipple.

9. A drying apparatus comprising a main air conduit, a branch conduit extending downwardly therefrom and having a lateral conduit extension provided with an upwardly directed air outlet, a support for material to be dried movable toward and from said outlet, and means supported by the main conduit for normally holding said support yieldingly in a raised position.

10. A drying apparatus comprising a main air conduit, having a fulcrum-supporting arm, a branch conduit extending downwardly therefrom and having a lateral conduit extension provided with an upwardly directed air outlet, a support for material to be dried movable toward and from said outlet, and a lever fulcrumed on the said arm above the support and having a shorter arm connected with the support and a weighted longer arm adapted to normally hold the support in a raised position.

11. In a drying apparatus of the character stated, a support formed as a seat for a package of the material to be dried, and provided with a central air-receiving opening, an upwardly projecting air distributing nozzle communicating with said opening, upwardly extending rods attached to marginal portions of the support, and a head attached to the upper ends of said rods and adapted to engage a suspending device.

12. A drying apparatus comprising an air conduit having an outlet, a valve adapted to automatically close said outlet, a movable support for material to be dried, normally held in a raised position above the outlet, the support being movable toward the outlet by the weight of undried material, and means, operated by the movement of the support toward the outlet, for opening said valve.

13. A drying apparatus comprising an air conduit having an outlet, a pivoted valve adapted to normally close the said outlet, a movable support for material to be dried, normally held in a raised position above the outlet and movable by the weight of the undried material toward the outlet, and a device between the support and valve whereby the valve is opened when the support is moved toward the outlet.

In testimony whereof I have affixed my signature, in presence of two witnesses.

GEORGE STONE.

Witnesses:
 C. F. BROWN,
 P. W. PEZZETTI.